Jan. 14, 1936.  H. D. GEYER  2,028,059
FLEXIBLE METAL FREEZING TRAY
Original Filed Feb. 16, 1933   2 Sheets-Sheet 1
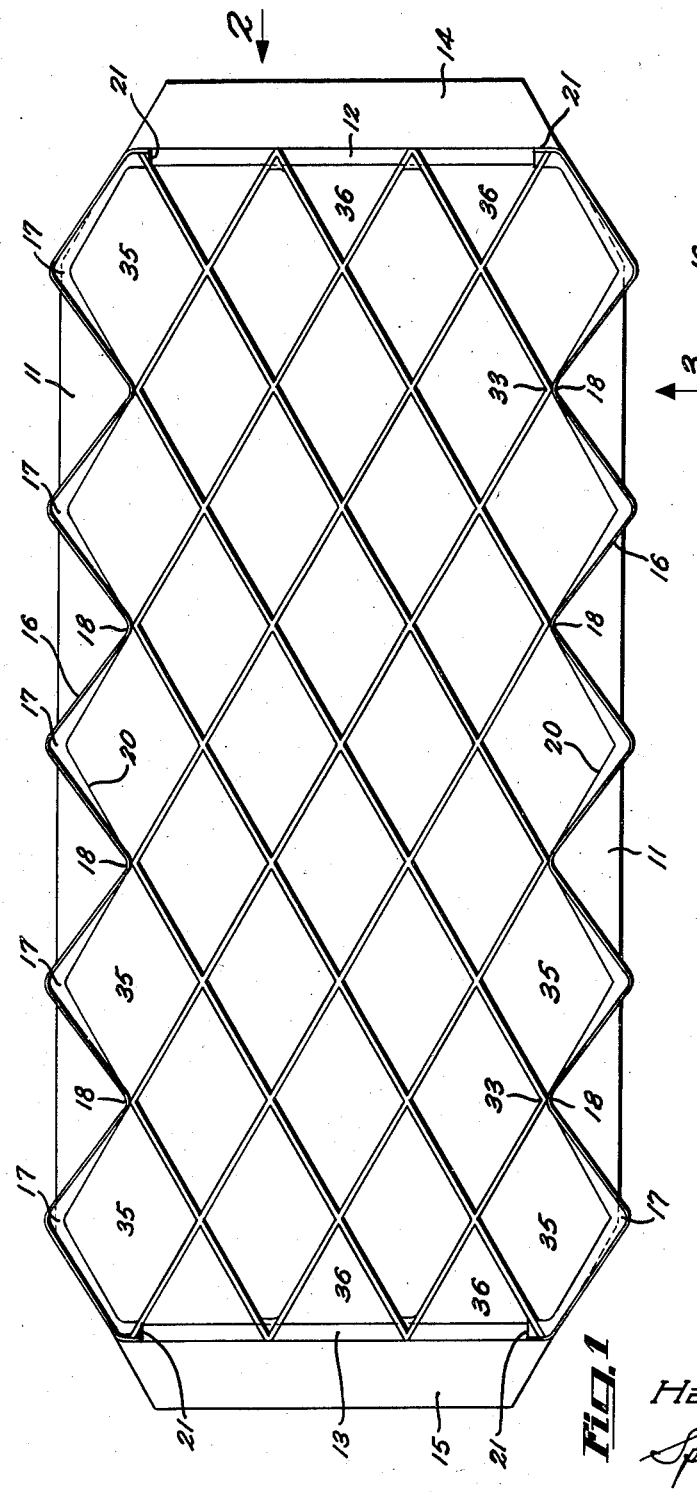
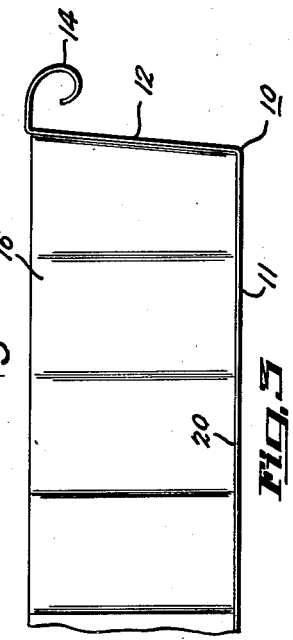
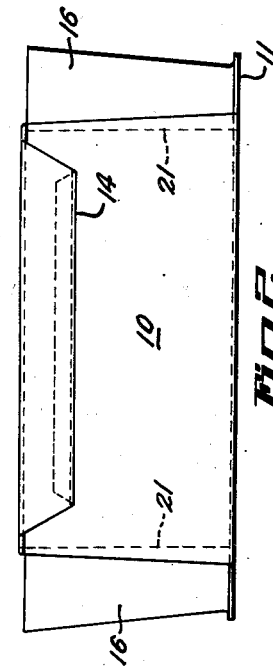
INVENTOR
Harvey D. Geyer
BY
Spencer Hardman & Fehr
his ATTORNEYS Jan. 14, 1936.　　　　　H. D. GEYER　　　　　2,028,059
FLEXIBLE METAL FREEZING TRAY
Original Filed Feb. 16, 1933　　　2 Sheets-Sheet 2

INVENTOR
*Harvey D. Geyer*
BY
*Spencer Hardman & Fehr*
his ATTORNEYS

Patented Jan. 14, 1936

2,028,059

UNITED STATES PATENT OFFICE 2,028,059

FLEXIBLE METAL FREEZING TRAY

Harvey D. Geyer, Dayton, Ohio, assignor, by mesne assignments, to General Motors Corporation, Detroit, Mich., a corporation of Delaware Application February 16, 1933, Serial No. 656,989
Renewed February 25, 1935

9 Claims. (Cl. 62—108.5)

This invention relates to freezing containers, especially such as are adapted for use in the freezing compartments of household refrigerators.

An object of the invention is to provide a metallic freezing tray which is sufficiently flexible to permit the easy removal of its frozen contents by bending the metal container pan as a unit. Flexible freezing trays of non-metallic material, such as resilient rubber, are now in wide use, however since non-metallic material is a relatively poor conductor of heat such trays ordinarily require a considerably longer freezing time than metal trays.

A feature of this invention is the provision of a metal water pan having a high degree of flexibility and a separate partitioning device which is insertable therein to properly divide the frozen contents into smaller blocks but which does not act to decrease the flexibility of the container pan itself.

Another feature is the combination of a highly flexible container pan and a resilient rubber partitioning grid. When the container pan is flexed the rubber grid which rests upon the bottom of the pan readily separates therefrom due to the fact that resilient rubber may be readily pulled loose from a frozen ice bond. It is thus clear that a resilient rubber grid will not prevent the easy bending of the flexible container pan even though the filled pan be hard frozen. After the flexing and loosening of the container pan from the grid and ice as a unit, the grid and ice may be readily removed as a unit and then the ice blocks removed from the grid by flexing the grid in a well-known manner. It is thus clear that the removal of the frozen contents from the tray may be easily accomplished without the necessity of any melting or flowing warm water over the tray, as must be done with all ordinary metal trays.

Further objects and advantages of the present invention will be apparent from the following description, reference being had to the accompanying drawings, wherein a preferred embodiment of one form of the present invention is clearly shown.

In the drawings:

Fig. 1 is a plan view of the flexible container pan with the removable grid inserted in place therein, according to this invention.

Fig. 2 is an end view, looking in the direction of arrow 2 of Fig. 1.

Fig. 3 is a partial side elevation, looking in the direction of arrow 3 of Fig. 1.

Similar reference characters refer to similar parts throughout the several views.

Figure 6:
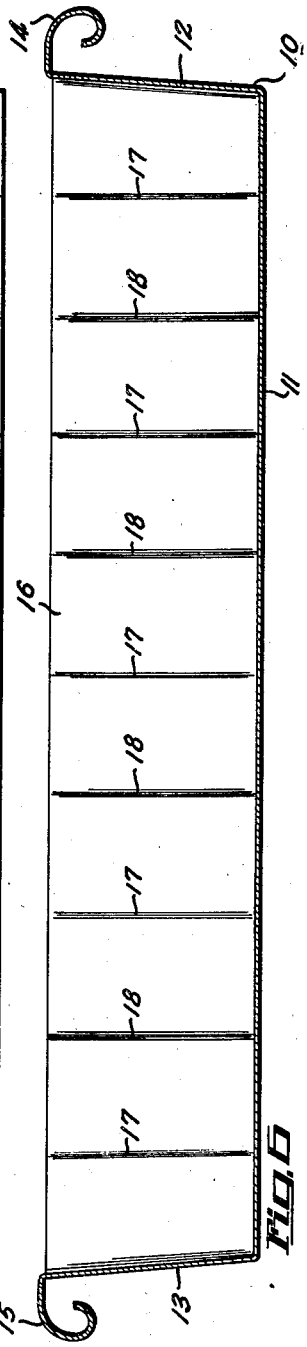
Fig. 6 is a longitudinal section through the container pan with the grid removed therefrom.

The flexible metal container pan 10 comprises a flexible bottom wall 11 and two end walls 12 and 13, which are preferably formed from a single piece of sheet metal (see Fig. 6), preferably phosphor-bronze or some other metal having spring-like properties. The upper edges of end walls 12 and 13 are preferably curled over as shown at 14 and 15 to provide suitable handles for handling the tray and for manually flexing same as will be described hereinbelow. The two side walls 16 are formed from separate pieces of resilient sheet metal, such as phosphor-bronze, to the zig-zag shape clearly shown in Fig. 1. These separate side walls 16 are then securely brazed, soldered or welded to the bottom wall 11 along the seams 20 and to the two end walls 12 and 13 along the seams 21 to provide a strong leak-proof water pan. If desired, these seams 20 and 21 may be strengthened by turning over a small flange along the bottom edge and end edges of the side walls 16 in order to provide an increased contacting area for the brazing or welding of these parts together. The zig-zag walls 16 are preferably shaped so that their outward projections 17 are slightly inclined outwardly, as clearly shown in Figs. 1 and 2. Now when the metal pan 10 is flexed as a unit about its transverse axis by pressing down on its two end handles 14 and 15 and pressing up from the bottom at its central portion, the zig-zag side walls 16 will easily stretch by a slight straightening out and permit such transverse bending of the pan. The bottom wall 11 being perfectly flat is, of course, easily flexed, while the corrugated side walls 16 can be increased in length by a bellows-like action to readily permit a limited bending of the pan about its transverse axis.

Figure 4:
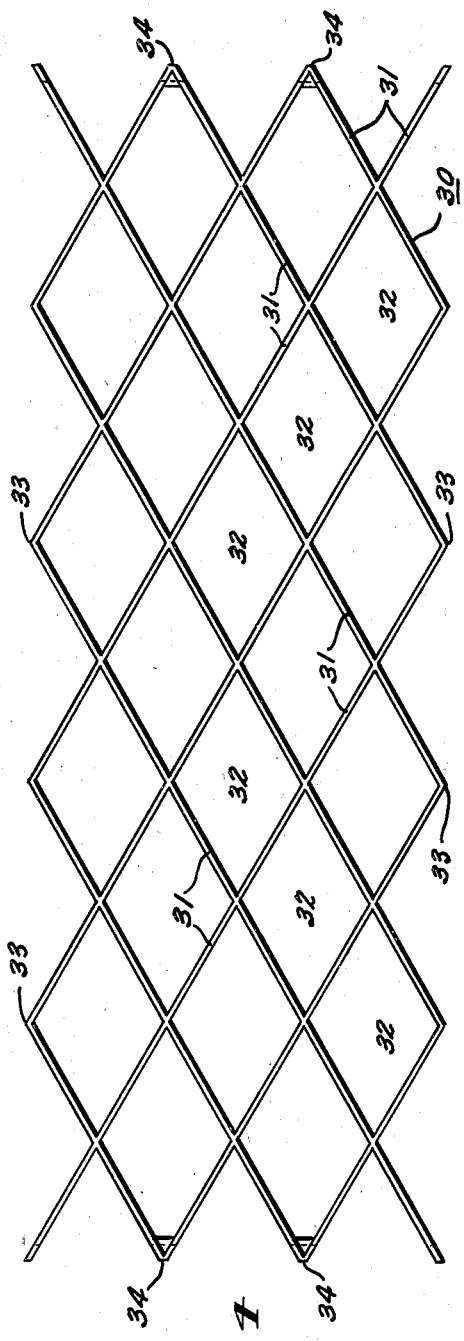
Fig. 4 is a plan view of the removable flexible grid.
Figure 5:
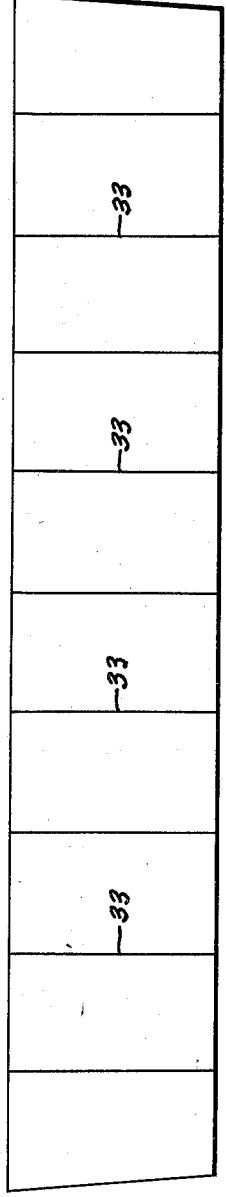
Fig. 5 is a side elevation of the grid.

Figs. 4 and 5 show a molded resilient rubber grid 30 having a series of intersecting partitions 31 forming a series of bottomless compartments 32. This grid 30 has a series of outward projections 33 which substantially contact with the inward projections 18 of the zig-zag walls 16 when the grid is inserted within pan 10, as clearly shown in Fig. 1, and provide a series of diamond-shaped compartments 35. Also the outward projections 34 at the ends of grid 30 substantially contact with the metal end walls 12 and 13 and provide a series of triangular ice compartments 36.

In operation, the pan 10 with grid 30 inserted therein is filled with water to the desired level and the filled tray inserted within a freezing compartment until the ice is frozen solid. Since the heat is extracted from the water primarily by being conducted through the outer walls of the container pan, it is clear that if these outer walls are of metal instead of rubber or other non-metallic material the rapidity of freezing will be greatly increased. Since the grid 30 is substantially completely immersed and surrounded by the water to be frozen, the freezing will take place almost as rapidly with a rubber grid 30 as it would with a metal grid.

Now to remove the frozen contents of the tray, the entire unit shown in Fig. 1 is first bent or flexed back about its transverse axis, either with the hands or by placing the bottom of the pan 10 against a corner of a table or other support and then pressing down at the end portions of the tray. Such bending or flexing of the outer pan 10 will immediately loosen its frozen bond with the ice and with the bottom edges of the rubber grid 30. The slight stretching and straightening out of the zig-zag side walls 16 during such backward bending of pan 10 will readily loosen said walls 16 from the ice in the diamond shaped compartments 35. The grid 30 with the ice therein may then be removed from the pan 10 and the ice blocks easily removed from the flexible grid 30 simply by pressing them out since ice does not stick strongly to resilient rubber.

The important advantages of the combination of the flexible metal container pan 10 and a flexible rubber grid 30 are: (1) almost as rapid freezing may be had as with an all metal pan and metal grid; (2) no melting or flowing of warm water over the unit is necessary in order to easily remove the frozen contents, such as is required with ordinary metal trays; (3) when only several ice blocks are wanted at a time, these may be easily removed as described above without wetting the remainder and then the grid 30 with the remaining ice blocks reinserted in the pan 10 and returned to the freezing compartment. Since such returned ice has not been melted or wetted with water it will not bond again to the metal pan 10 and hence any subsequent removal of ice blocks will be rendered that much easier.

While the form of embodiment of the present invention as herein disclosed, constitutes a preferred form, it is to be understood that other forms might be adopted, all coming within the scope of the claims which follow.

What is claimed is as follows:

1. A freezing tray comprising: a unitary flexible metal pan having zig-zag side wall and a separate removable flexible grid inserted therein, said grid having portions substantially contacting the inwardly extending projections of said zig-zag side wall and forming therewith a series of ice compartments.

2. A freezing tray comprising: a unitary flexible metal pan having zig-zag side wall and a separate removable flexible grid inserted therein, said grid having a zig-zag partition corresponding to and lying adjacent said zig-zag side wall and forming therewith a series of ice compartments.

3. A freezing tray comprising: a unitary flexible metal pan having zig-zag side wall and a separate removable flexible grid inserted therein, said metal pan being capable of being flexed as a unit due to the flexibility of said zig-zag side wall and the flexibility of said grid, whereby to facilitate the removal of the frozen contents from said tray.

4. A freezing tray comprising: a unitary water retaining metal pan having a smooth flat flexible bottom and two opposed flexible side walls having vertical corrugations therein, said metal pan being bendable as a unit about an axis transverse to said corrugated side walls due to the stretchability of said side walls.

5. A freezing tray comprising: a unitary water retaining metal pan having a flexible bottom and two opposed flexible zig-zag side walls, said metal pan being easily bendable as a unit about an axis transverse to said zig-zag side walls due to the resilient accordion action of said zig-zag walls, and a removable flexible partitioning device insertable in said metal pan for dividing same into a series of compartments.

6. A freezing tray comprising: a unitary water retaining metal pan having a flexible bottom and two opposed flexible side walls having vertical corrugations therein, said metal pan being bendable as a unit about an axis transverse to said corrugated side walls due to the stretchability of said side walls, and a removable flexible grid insertable within said metal pan for dividing same into a series of ice compartments.

7. A freezing tray comprising: a water container pan having a plain flat flexible sheet metal bottom, two opposed end walls, and two opposed corrugated sheet metal side walls, said corrugated side walls being formed separately from said plain bottom and joined thereto in a plain seam by brazing or the like to provide a water tight pan, said pan being bendable to a material extent as a unit about an axis transverse to said side walls due to the stretchability of said corrugated side walls.

8. A freezing tray comprising: a liquid container pan having a substantially non-stretchable but flexible metal bottom wall, two opposed end walls, and two opposed, longitudinally stretchable corrugated sheet metal side walls, said container pan being bendable as a unit about an axis extending transversely to said side walls due to the stretchability of said side walls.

9. A freezing tray comprising: a unitary flexible metal container pan having a flexible bottom and two opposed longitudinally stretchable side walls, and a separate and removable flexible grid inserted therein and dividing same into ice block compartments, said metal pan being bendable as a unit about an axis extending transversely to said side walls whereby to loosen said pan from the frozen contents and grid as a unit.

HARVEY D. GEYER.